(12) United States Patent  (10) Patent No.: US 7,944,883 B2
Orth  (45) Date of Patent: May 17, 2011

(54) WIRELESS MESH NETWORKS

(75) Inventor: Kelly M. Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 661 days.

(21) Appl. No.: 11/712,218

(22) Filed: Feb. 28, 2007

(65) Prior Publication Data

US 2007/0206616 A1  Sep. 6, 2007

Related U.S. Application Data

(60) Provisional application No. 60/779,488, filed on Mar. 6, 2006.

(51) Int. Cl.
*H04W 4/00* (2009.01)
*H04L 12/28* (2006.01)
*H04L 12/56* (2006.01)
*H04J 4/00* (2006.01)

(52) U.S. Cl. ........................ 370/330; 370/401

(58) Field of Classification Search .................. None
See application file for complete search history.

(56) References Cited

U.S. PATENT DOCUMENTS

| | | | | |
|---|---|---|---|---|
| 6,078,251 | A * | 6/2000 | Landt et al. ............... | 340/10.41 |
| 7,502,354 | B1 * | 3/2009 | Maufer ..................... | 370/338 |
| 7,564,781 | B2 * | 7/2009 | Liang ........................ | 370/229 |
| 2002/0065631 | A1 | 5/2002 | Loechner | |
| 2003/0171115 | A1 * | 9/2003 | Batra et al. ............... | 455/434 |
| 2003/0199279 | A1 * | 10/2003 | Roberts .................... | 455/452.2 |
| 2004/0208152 | A1 | 10/2004 | Perkins et al. | |
| 2005/0007963 | A1 * | 1/2005 | Huang et al. ............. | 370/255 |
| 2005/0074015 | A1 * | 4/2005 | Chari et al. .............. | 370/400 |
| 2005/0201349 | A1 | 9/2005 | Budampati | |
| 2005/0213612 | A1 | 9/2005 | Pister et al. | |
| 2005/0281215 | A1 | 12/2005 | Budampati et al. | |
| 2006/0002368 | A1 | 1/2006 | Budampati et al. | |
| 2006/0028997 | A1 | 2/2006 | McFarland | |
| 2006/0029060 | A1 | 2/2006 | Pister | |
| 2006/0029061 | A1 | 2/2006 | Pister et al. | |
| 2006/0039298 | A1 | 2/2006 | Zuniga et al. | |
| 2006/0074502 | A1 | 4/2006 | McFarland | |
| 2006/0114866 | A1 * | 6/2006 | Kim et al. ................ | 370/338 |
| 2006/0114881 | A1 * | 6/2006 | Chari et al. .............. | 370/351 |

(Continued)

FOREIGN PATENT DOCUMENTS

WO  99/14898 A1  3/1999

(Continued)

OTHER PUBLICATIONS

Shruti Chugh et al., "An Energy Efficient Collaborative Framework for Event Notification in Wireless Sensor Networks" Proceedings of the 28th Annual IEEE International Conference on Local Computer Networks (LCN'03) 2003 (1-10).

(Continued)

*Primary Examiner* — Chirag G Shah
*Assistant Examiner* — Ashley L Shivers
(74) *Attorney, Agent, or Firm* — Kinney & Lange, P.A.

(57) ABSTRACT

A wireless network system includes overlapping wireless mesh networks. Nodes that are members of more than one mesh network are capable of communicating with the gateways of each of those mesh networks, which allows sharing information between interrelated control systems through the wireless network system.

20 Claims, 5 Drawing Sheets

U.S. PATENT DOCUMENTS

| | | |
|---|---|---|
| 2006/0227729 A1 | 10/2006 | Budampati et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0206521 A1* | 9/2007 | Osaje ............... 370/315 |
| 2007/0206616 A1 | 9/2007 | Orth |

FOREIGN PATENT DOCUMENTS

| | | |
|---|---|---|
| WO | 01/41348 A2 | 6/2001 |
| WO | WO 02/45360 | 6/2002 |
| WO | WO 03/023536 | 3/2003 |
| WO | WO 2005/099196 | 10/2005 |

OTHER PUBLICATIONS

Niklas Johansson et al., "JUMP Mode—A Dynamic Window-based Scheduling Framework for Bluetooth Scatternets," MOBIHOC '01 Proceedings of the 2nd ACM International Symposium on Mobile Ad Hoc Networking & Computing, Jan. 1, 2011 (pp. 204-211).

Extended European Search Report of the European Patent Office in counterpart foreign application EP07751936, filed Feb. 28, 2007.

* cited by examiner

WIRELESS MESH NETWORKS

REFERENCE TO RELATED APPLICATION

This application claims priority from provisional patent application Ser. No. 60/779,488 filed Mar. 6, 2006, which is incorporated by reference.

BACKGROUND OF THE INVENTION

The present invention relates to wireless mesh networks, and in particular to a network formed of multiple mesh networks that partially overlap.

In wireless mesh networks, each device must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed as in a point-to-point system which employs remote devices talking directly to a centralized base-station.

A mesh network protocol allows for the formation of alternate paths for messaging between devices and between devices and a data collector, or a bridge or gateway to some higher level higher-speed data bus. Having alternate, redundant paths for wireless messages enhances data reliability by ensuring there is at least one alternate path for messages to flow even if another path gets blocked or degrades due to environmental influences or due to interference.

In wireless mesh network systems designed for low power, sensor/actuator-based applications, many devices in the network must be powered by long-life batteries or by low power energy-scavenging power sources. Power outlets, such as 120 V AC utilities. are typically not located nearby or may not be allowed into the Hazardous Locations areas where the instrumentation. (sensors) and actuators must be located without incurring great installation expense. The economic need for low installation cost drives the need for battery-powered devices communicating as part of a wireless mesh network. Effective utilization of limited power source, such as a primary cell battery which cannot be recharged, is vital for a well functioning wireless device. Batteries are expected to last more than 5 years and preferably last as long as the life of the product.

Some mesh network protocols are deterministically routed such that every device has an assigned parent and at least one alternate parent. In the hierarchy of the mesh network, much as in a human family, parents have children, children have grand-children, and so on and so forth. Each device (or node) relays the messages for their descendants through the network to some final destination such as a gateway. The parenting devices may be battery-powered or limited-energy powered devices. The more descendants a device has the more traffic it must route, which in turn directly increases its own power consumption and diminishes its battery life.

In order to save power, some protocols limit the amount of traffic any node can handle during any period of time by only turning their radios ON for limited amounts of time to listen for messages. Thus, to reduce average power, the protocol may allow duty-cycling of the radios between ON and OFF states. Some protocols may use a global duty cycle to save power such that the entire network is ON and OFF at the same time. Other protocols (e.g. TDMA-based protocols) may use a local duty cycle where only the communicating pair of nodes that are linked together are scheduled to turn ON and OFF in a synchronized fashion at predetermined times. Typically, the link is pre-determined by assigning the pair of nodes a specific time slot for communications, an RF frequency channel to be used by the radios, who is to be listening/receiving (Rx) and who is to be sending/transmitting (Tx) at that moment in time.

Some protocols employ the concept of assigning links to nodes on a regular repetitive schedule and thereby enable regular delivery of updates and messages from devices in the network. Some advanced TMDA-based protocols may employ the concept of multiple active schedules, these multiple schedules running all at the same time or with certain schedules activated/deactivated by a global network controller as the need arises. For example, slow active schedules link nodes sending messages with longer periods of time (long cycle time) between messages to achieve low power consumption. Fast active schedules link nodes sending messages more rapidly for better throughput and lower latency, but result in higher power consumption in the nodes. With protocols that allow multiple active schedules, some schedules could be optimized for upstream traffic, others for downstream traffic and yet others for network management functions such as device joining and configurations. Globally activating/deactivating various schedules throughout the entire network in order to meet different needs at different times provides a modicum of flexibility for achieving advantageous trade-offs between power consumption and low latency, but applies the same schedule to all nodes and thus does not provide local optimization.

In a synchronized system, whether it is globally synchronized or locally synchronized, nodes will have to wait to transmit until their next predetermined ON time before they can pass messages. Waiting increases latency, which can be very detrimental in many applications if not bounded and managed properly. If the pair of nodes that are linked together are not synchronized properly, they will not succeed in passing messages because the radios will be ON at the wrong time or in the wrong mode (Rx or Tx) at the wrong time. If the only active schedule has a long cycle time, the time between scheduled links will be long and latency will suffer. If a fast schedule is activated, the time between scheduled links will be short but battery life will be measurably reduced over time.

Some protocols allow running a slow global schedule in the background and globally activating/deactivating an additional fast schedule. Since it takes time to globally activate a fast schedule throughout the entire network and get confirmation back from all nodes that they have heard the global command, the network or sub-network remains in the less responsive mode during the transition time. Furthermore, with a globally activated fast schedule, power is wasted in all the parenting nodes in the network, even those whose descendants will not benefit from the fast schedule. These unappreciative parent nodes must listen more often on the global fast active schedule (i.e. turn their radios ON to Rx more often); even though their descendants have nothing extra to send that a regular active schedule wouldn't suffice in that portion of the network.

Some protocols may limit the number of descendants a node can have, thereby reducing the load it must support. Other protocols may employ a combination of all of these measures to reduce average power consumption. All of these power-saving measures have the effect of reducing the availability of the nodes in the network to do the work of passing messages, thereby increasing the latency of messages delivered through the network. Duty-cycling the radio increases latency. Hopping messages from node to node increases latency. Increasing hop depth (hop count) by limiting the number of descendants increases latency. Running a slow active schedule (long cycle period) increases latency. Even globally activating a fast active schedule takes time. It is likely that the value of information diminishes with time, so the longer the latency the less valuable the information may be.

Improvements to the protocol to reduce the trade-off between power consumption and latency are very valuable since they allow the same protocol to be used for a wide variety of end applications without user intervention and configuration. Improvements that provide local optimization over global optimization are the most flexible and most valuable.

Finally, wireless networks need not and should not be constrained to communicate using the same pathways as a traditional wired network. Much more flexibility in establishing pathways between nodes in the same network, as well as between nodes in separate networks and between nodes in separate sub-networks is desired and possible using wireless networking.

BRIEF SUMMARY OF THE INVENTION

A wireless network system includes multiple wireless mesh networks that overlap. Each mesh network includes a gateway and a plurality of nodes capable of transmitting and receiving messages. The overlap of the mesh networks occurs at those nodes that are members of more than one mesh network. These common nodes are capable of communicating with the gateway of each mesh network of which they are a member.

BRIEF DESCRIPTION OF THE DRAWINGS

FIGS. 3A-3D are diagrams showing a network including four overlapping mesh networks with subnetworks.

DETAILED DESCRIPTION

Mesh networks typically have only one gateway per 'cloud' of nodes. The network is normally thought of as homogenous, that is as all belonging to one another. This invention brings forth the idea of overlapping wireless Level 0 networks which share some or all of the nodes in the networks with each other, each overlapping network managed by a separate gateway, including the idea of sub-networks within each network.

Figure 1A:
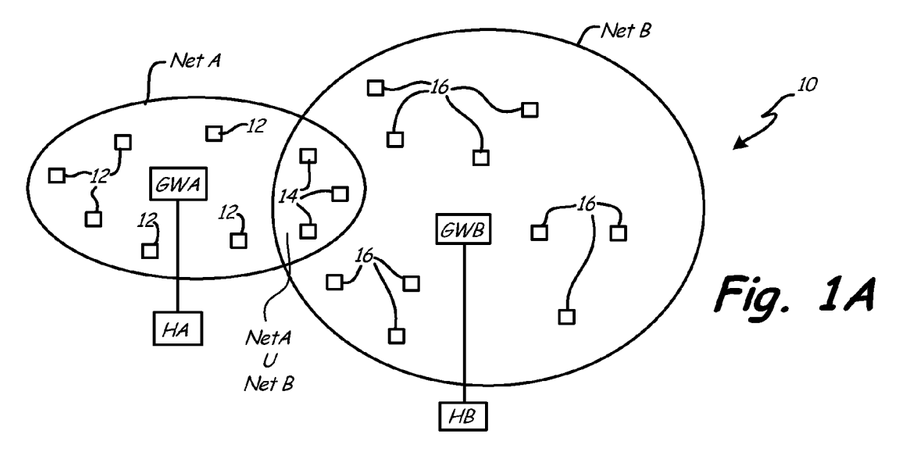
FIGS. 1A and 1B are diagrams showing a network including two overlapping mesh networks.
Figure 1B:
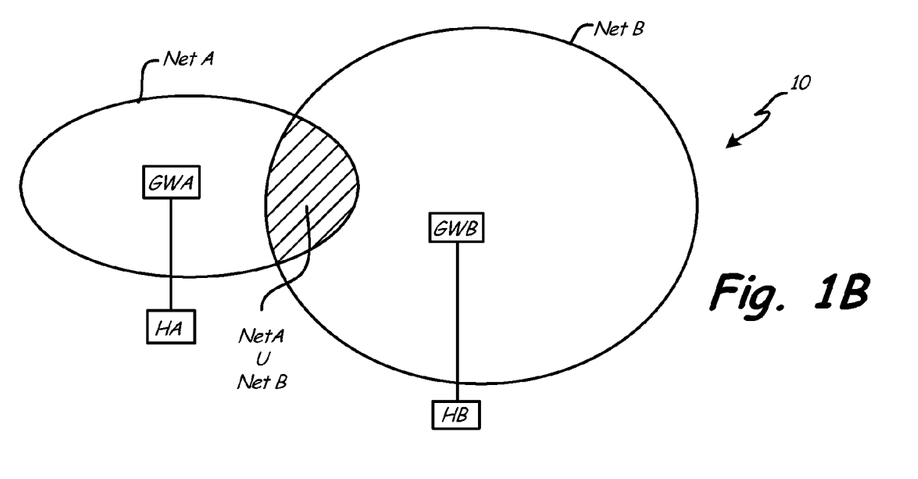

Consider the case of control system 10 shown in FIGS. 1A and 1B where network Net A is connected through gateway GWA to host HA, and network Net B is connected through gateway GWB to host HB. Normally, each network Net A, Net B has a separate gateway GWA, GWB that manages its own network independent of the others. Even though they are shown in FIG. 1 as overlapping networks, Net A and Net B could be logically diagrammed as entirely separate networks with no interactions between them except as might be coordinated by a common shared backbone connection between gateways GWA and GWB.

In this case, Net A and Net B are indeed overlapping both physically and logically. Net A includes nodes 12 and 14, while Net B includes nodes 14 and 16. This might be the case in the transition zone between two process units in a plant where, for example, an upstream process unit delivers material or energy to a downstream process unit. The two connected process units may need to coordinate activities for assuring control of energy flow or mass flow (or both) for process optimization for monitoring purposes, for diagnostics, or for other reasons. All of the nodes within Net A may be overlapping within Net B, or just some of the nodes within Net A may be overlapping with some of the nodes within Net B as shown in FIG. 1A. Gateway GWA serves as a source of control messages from host HA and as a data destination for all nodes 12 solely within Net A as well as those nodes 14 in Net B that are defined to be in union with Net A. Gateway GWB serves as a source of control messages from host B and as a data destination for all nodes 16 solely within Net B as well as those nodes 14 in Net A that are defined to be in union with Net B. The definitions of which nodes are in union with which network can be logically defined as long as a path can be defined which connects the nodes to each other.

In FIG. 1B, consider the overlapping nodes within the region labeled "Net A U Net B". These nodes may be (a) primarily assigned to Net B with secondary connection to Net A, or (b) primarily assigned to Net A with secondary connection to Net B, or (c) assigned to both Net B and Net A equally. All that really needs to happen to maintain coordination between them is that GWA and GWB have the ability to maintain their unique schedules as assigned to the common nodes, and for the nodes to deal with schedule conflicts as assigned by Net A and Net B. For example, scheduling conflicts can be resolved by pre-definable or by user definable priority assignments, by first come/first served availability, or by any other mutually agreeable resolution. The inevitable conflicts within individual nodes as they try to serve the separate gateways can be resolved in these ways as well as more elaborate ways such as multifunctional methods.

Figure 2A:
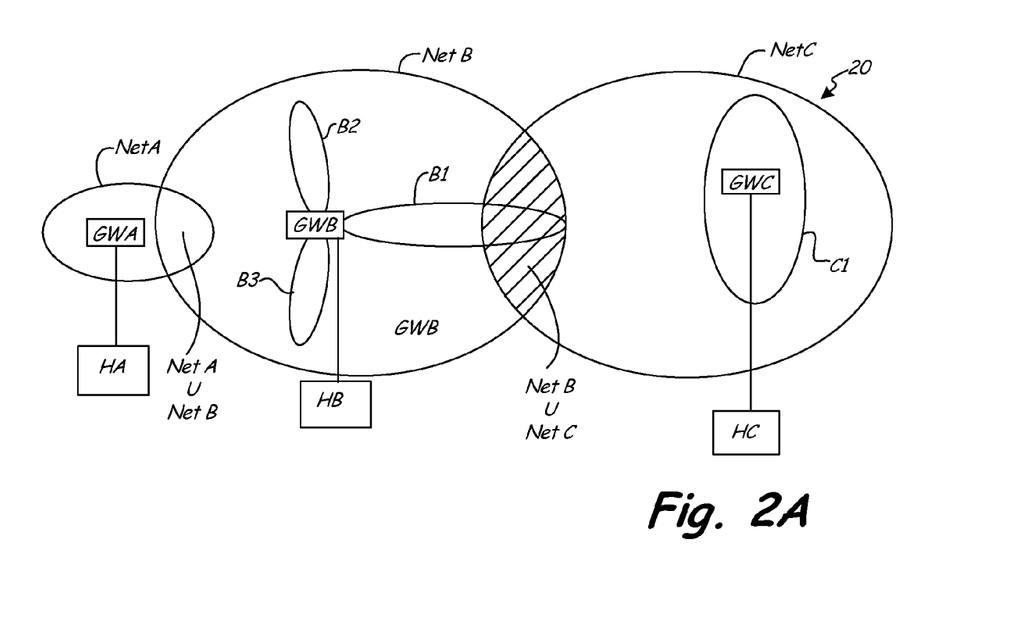
FIGS. 2A and 2B are diagrams showing a network including three overlapping mesh networks with subnetworks.
Figure 2B:
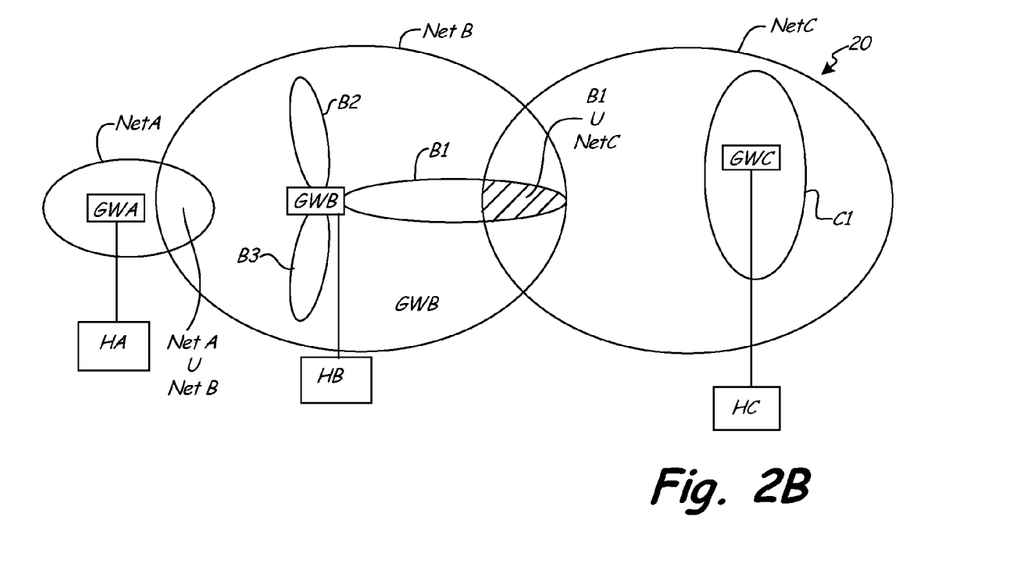

FIGS. 2A-2B show system 20, which includes networks Net A, Net B and Net C connected to hosts HA, HB, and HC, respectively. Consider the case of Net B and Net C, which overlap each other. Net B has Sub-Nets B1, B2 and B3 which are all running on separate schedules within the overall schedule for Net B. Sub-Nets B1-B3 may be of an ad-hoc nature, or they may be semi-permanent or permanent sub-nets of a network. In the example shown in FIG. 2B, a portion of Sub-Net B1 can be logically defined to be in union with Net C (B1 U Net C), rather than the complete over-lapping region Net B U Net C shown in FIG. 2A. Then only Sub-Net B1 needs to be coordinated with Net B and with Net C, and the schedule conflicts resolved for the nodes in the union of Net B, Sub-Net B1 and Net C.

FIGS. 3A-3D show control system 30, which includes networks Net A-Net D, and gateways GWA-GWD and hosts HA-HD. Net D includes a portion of which overlaps portions of Net B and portions of Net C. A logical joining of those nodes in union with Net B, Net C and Net D can be assigned to coordinate schedules amongst these nodes for servicing three individual gateways. For example, this three-part use case might represent a network (e.g. Net D) in a plant which provides utilities, such as steam, to several process units simultaneously. Net D needs to control the steam flow and anticipate the energy load throughout several units within a plant. Net B needs to control the process within an upstream unit. Net C needs to control the process within a downstream unit. Net B needs to know downstream load conditions from Net C, while Net C needs to know upstream supply conditions from Net B. Net B and Net C both need to know energy availability conditions from Net D. Similarly, Net D needs to know energy load conditions from Net B and from Net C. With the flexibility offered by wireless networks, the information and control can be allowed to flow horizontally through several networks or sub-networks as well as vertically through the traditional network hierarchies.

Figure 3A:
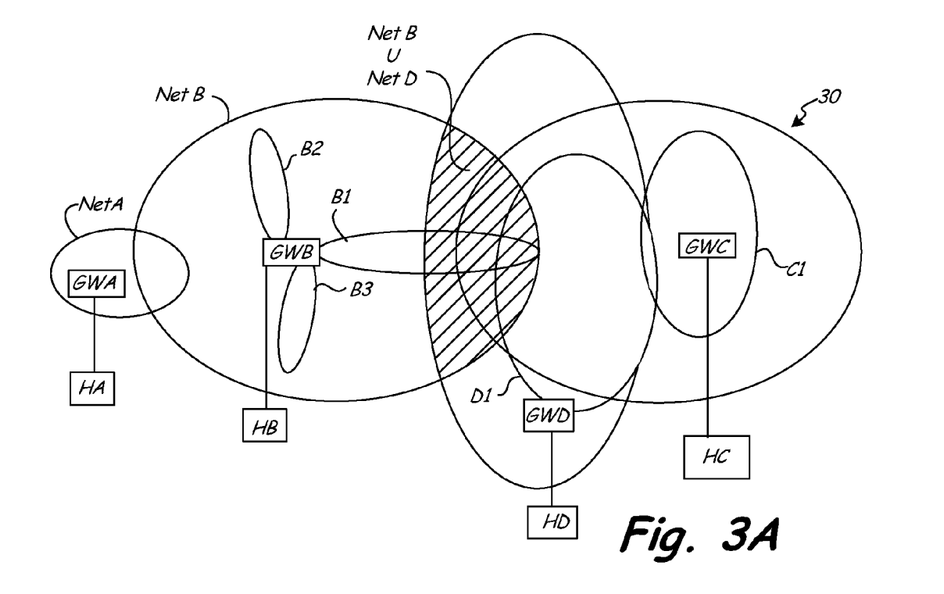
Figure 3B:
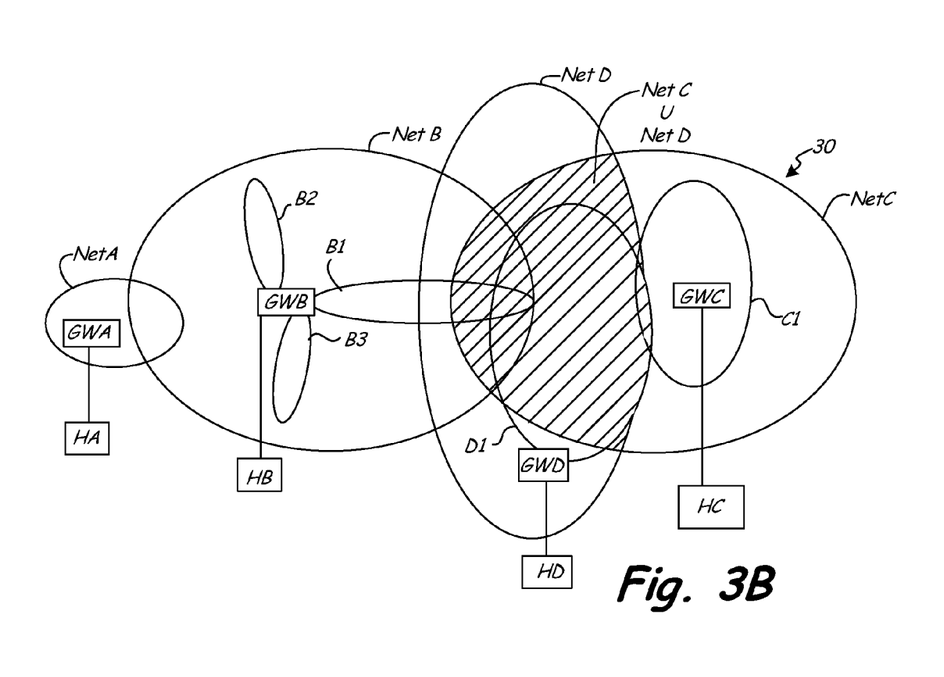
Figure 3C:
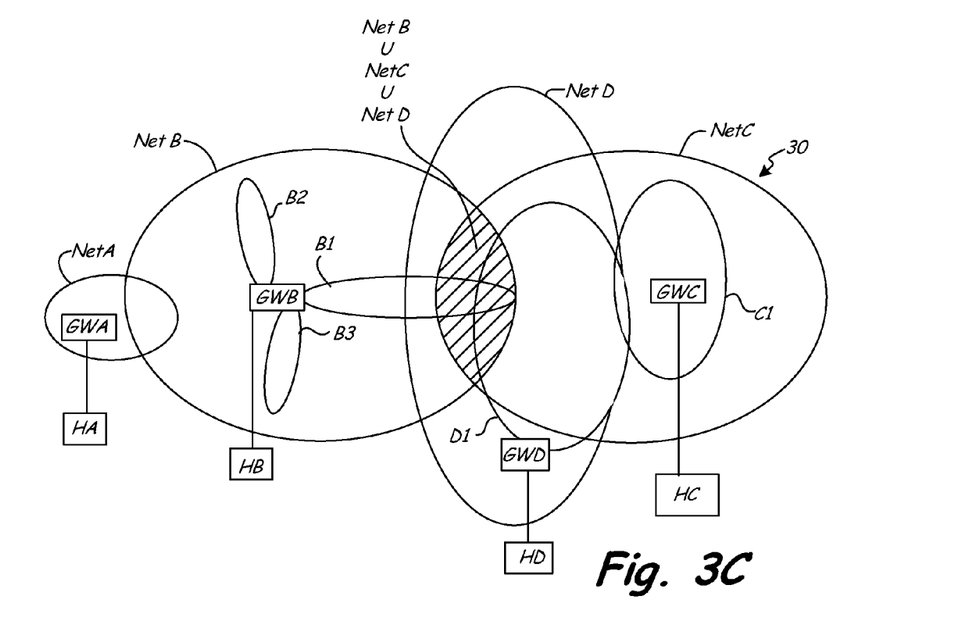
Figure 3D:
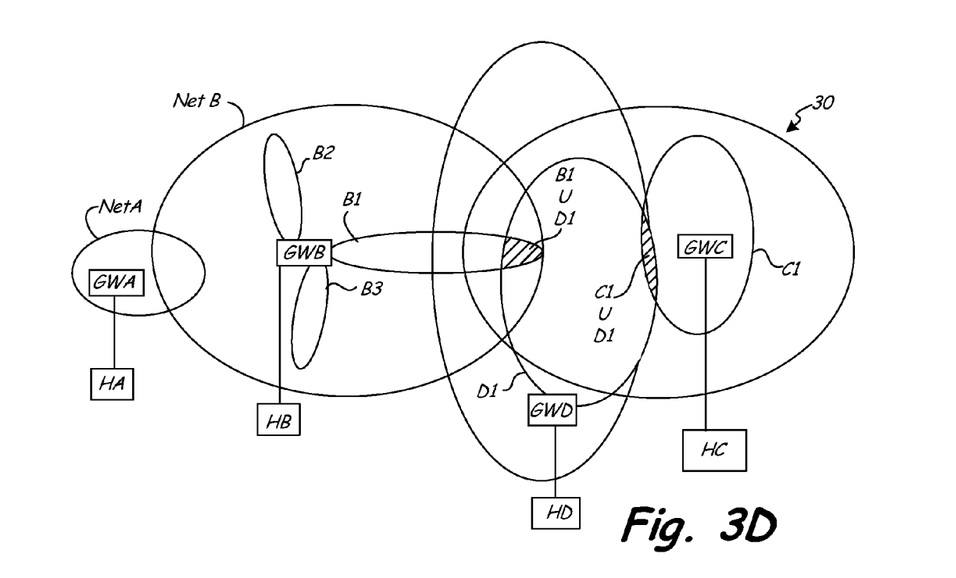

FIG. 3A shows the overlap of networks Net B and Net D in shaded region Net B U Net D. FIG. 3B shows shaded region Net C U Net D. FIG. 3C shows the overlap of three networks Net B-Net D in shaded region Net B U Net C U Net D. Finally, FIG. 3D shows overlap of Sub-Net D1 with Sub-Net B1 (shaded region B1 U D1), and Sub-Net D1 with Sub-Net C1 (C1 U D1).

By coordinating data flow in multiple pathways across multiple networks in a neural network fashion rather than through pre-defined pathways characteristic of wired, bus-oriented architectures, wireless networks offer tremendous advantages for flexibility, efficiency and optimization of process monitoring and control.

Figure 4:
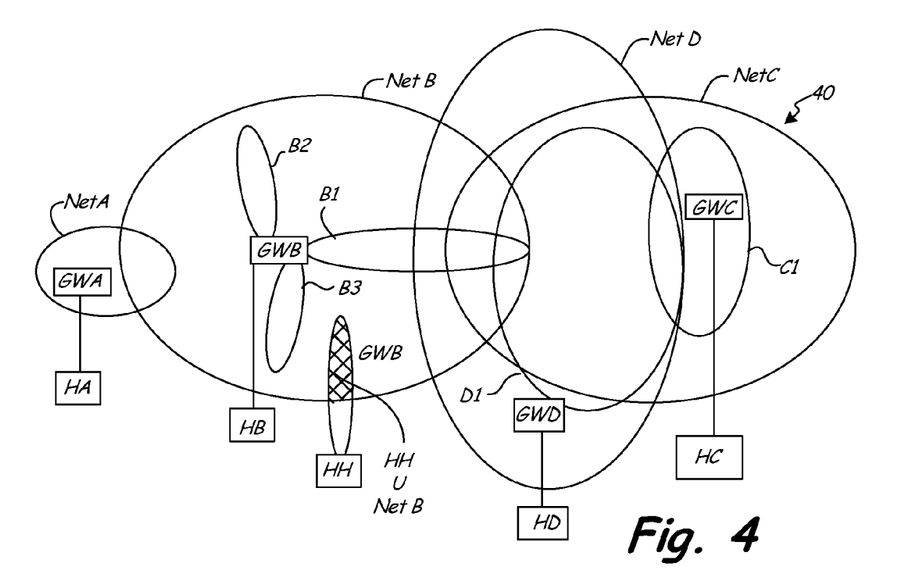
FIG. 4 is a diagram showing interaction of a handheld communication device with the network of FIGS. 3A-3D.

FIG. 4 illustrates control system 40, which is similar to control system 30, but which also includes handheld communicator HH. In FIG. 4, the shaded region HH U Net B shows the nodes of Net B that are accessed by handheld communicator HH. As a service technician moves, the overlapping area will shift within Net B, and may shift to another one of the mesh networks within control system 40.

Although the present invention has been described with reference to preferred embodiments, workers skilled in the art will recognize that changes may be made in form and detail without departing from the spirit and scope of the invention. For example, although FIGS. 1A-4 show systems in which each gateway is connected over a high speed network to a different host computer, in other embodiments two or more gateways may share a host computer. Similarly, although each network is shown as having a single gateway, networks with more than one gateway may also be used.

The invention claimed is:

1. A wireless network comprising:
    a first wireless mesh network including a first gateway and a first plurality of nodes that transmit and receive messages over synchronized links between pairs of nodes, each link pre-determined by assignment of an RF frequency channel and a communication time slot on a first communication cycle, wherein the combination of the assigned RF frequency channel and communication time slot is not shared with any other link in the first wireless mesh network; and
    a second wireless mesh network including a second gateway and a second plurality of nodes that transmit and receive messages over synchronized links between pairs of nodes, each link pre-determined by assignment of an RF frequency channel and a communication time slot on a second communication cycle, wherein the combination of the assigned RF frequency channel and communication time slot is not shared with any other link in the second wireless mesh network;
    wherein the first and second mesh networks at least partially overlap so that at least one common node is a member of both the first plurality of nodes and the second plurality of nodes and communicates with the first gateway through the first wireless mesh network and communicates with the second gateway through the second wireless mesh network.

2. The wireless network of claim 1 and further comprising:
    a third wireless mesh network including a third gateway and a third plurality of nodes that transmit and receive messages over synchronized links between pairs of nodes, each link pre-determined by assignment of an RF frequency channel and a communication time slot on a third communication cycle, wherein the combination of the assigned RF frequency channel and communication time slot is not shared with any other link in the third wireless mesh network;
    wherein the third mesh network at least partially overlaps at least one of the first and second mesh networks.

3. The wireless network of claim 1, wherein the first wireless network includes a sub-network that operates on a separate communication cycle within an overall communication cycle of the first network.

4. The wireless network of claim 3, wherein the sub-network of the first wireless network at least partially overlaps the second wireless network so that at least one common node is a member of the sub-network and the second wireless network.

5. The wireless network of claim 1, wherein the at least one common node operates on both the first communication cycle and the second communication cycle.

6. The wireless network of claim 1, wherein the first gateway is connected to a first host computer, wherein the first host computer provides control messages to the first gateway.

7. The wireless network of claim 6, wherein the second gateway is connected to a second host computer, wherein the second host computer provides control messages to the second gateway.

8. A wireless network comprising:
    a plurality of wireless mesh networks that share a set of common nodes that are members of more than one of the wireless mesh networks;
    a plurality of gateways, each gateway being associated with one of the wireless mesh networks;
    wherein the common nodes communicate with more than one gateway over synchronized links between pairs of nodes, each link pre-determined by assignment of an RF frequency channel and a communication time slot;
    wherein the combination of the assigned RF frequency channel and communication time slot is not duplicated within each of the wireless mesh networks; and
    wherein each of the wireless mesh networks operates a communication cycle not shared with any of the other wireless mesh networks.

9. The wireless network of claim 8, wherein the plurality of wireless mesh networks include a first wireless mesh network and a second wireless mesh network.

10. The wireless network of claim 9, wherein the plurality of wireless mesh networks include a third wireless mesh network.

11. The wireless network of claim 9, wherein the first wireless network includes a sub-network that operates on a separate communication cycle within an overall communication cycle of the first network.

12. The wireless network of claim 11, wherein the sub-network of the first wireless network at least partially overlaps the second wireless network so that at least one common node is a member of the sub-network and the second wireless network.

13. The wireless network of claim 9, wherein the first wireless network operates on a first communication cycle and the second wireless network operates on a second communication cycle.

14. The wireless network of claim 13, wherein the common nodes operate on both the first communication cycle and the second communication cycle.

15. The wireless network of claim 9, wherein the plurality of gateways includes a first gateway associated with the first wireless mesh network and connected to a first host computer, wherein the first host computer provides control messages to the first gateway.

16. The wireless network of claim 15, wherein the plurality of gateways includes a second gateway associated with the second wireless mesh network and connected to a second host computer, wherein the second host computer provides control messages to the second gateway.

17. The wireless network of claim 8, wherein the set of common nodes operates on each of the separate communication cycles.

18. The wireless network of claim 8, wherein the plurality of wireless mesh networks and the plurality of gateways form a part of a plurality of interrelated process control systems.

19. The wireless network of claim 5, wherein the one common node resolves conflicts between the first communication cycle and the second communication cycle in communicating through the first wireless mesh network and through the second wireless mesh network.

20. The wireless network of claim 17, wherein the set of common nodes resolve conflicts between each of the wireless mesh network communication cycles associated with the gateways with which they communicate.

* * * * *